UNITED STATES PATENT OFFICE.

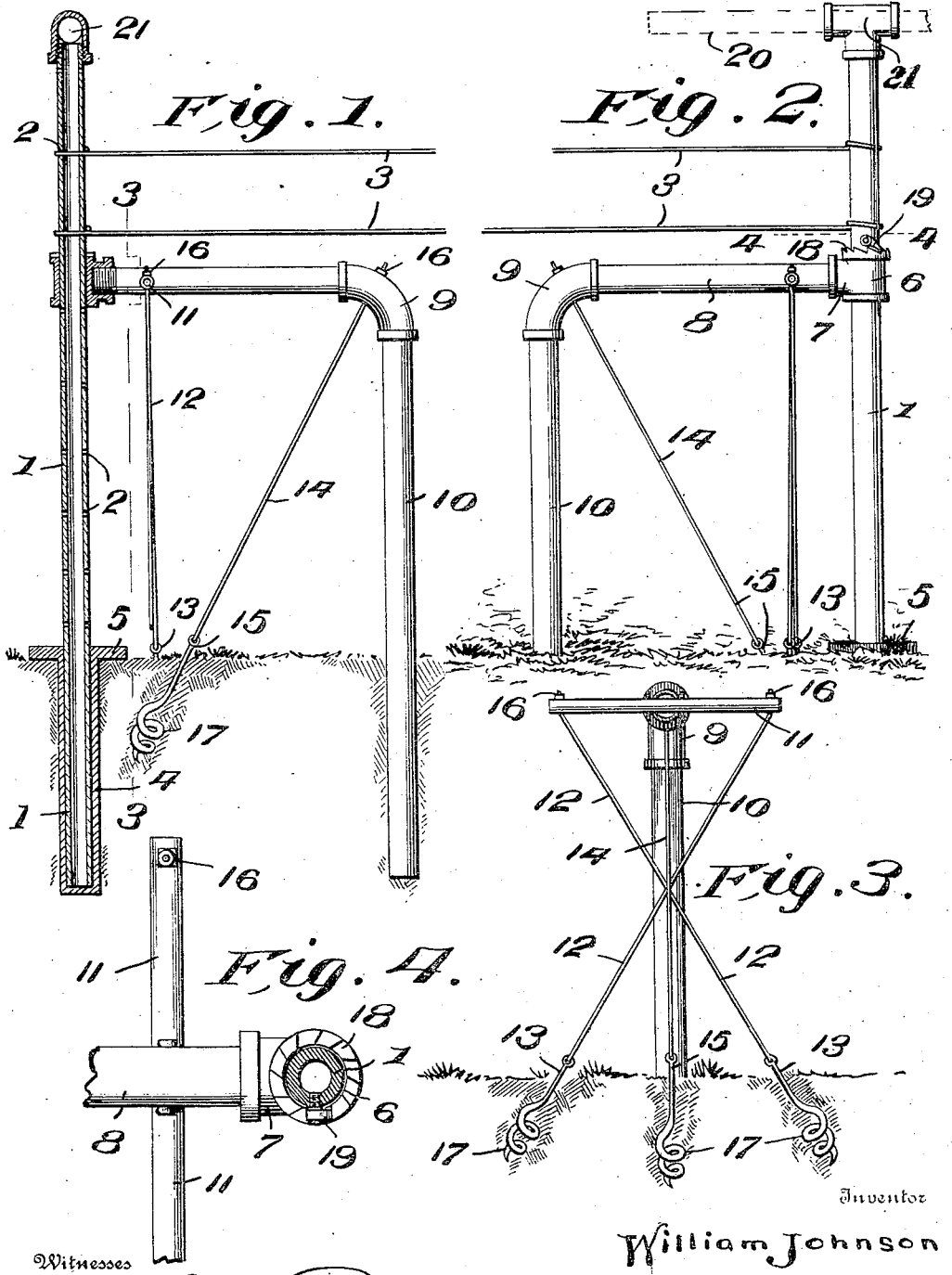

WILLIAM JOHNSON, OF FREMONT, OHIO.

COMBINED BRACE AND STRETCHER.

No. 855,641.  Specification of Letters Patent.  Patented June 4, 1907.

Application filed December 19, 1906. Serial No. 348,564.

*To all whom it may concern:*

Be it known that I, WILLIAM JOHNSON, a citizen of the United States, residing at Fremont, in the county of Sandusky and State of Ohio, have invented certain new and useful Improvements in a Combined Brace and Stretcher; and I do hereby declare the following to be a full, clear, and exact description of the invention, such as will enable others skilled in the art to which it appertains to make and use the same.

My invention relates to new and useful improvements in a combined brace and stretcher and more particularly to that class adapted to be used in connection with fences and my object is to provide a device of this class wherein the wires constituting the fences may be tightened or stretched and the post thoroughly braced at all times.

A further object is to provide means for holding the wires taut as the same are wound upon the post.

Other objects and advantages will be hereinafter referred to and more particularly pointed out in the claims.

In the accompanying drawings which are made a part of this application, Figure 1 is an elevation partly in section of my improved brace and stretching apparatus. Fig. 2 is a side elevation thereof. Fig. 3 is a sectional view as seen from line 3—3 Fig. 1, and, Fig. 4 is a sectional view on an enlarged scale as seen from line 4—4 Fig. 2.

Referring to the drawings in which similar reference numerals designate corresponding parts throughout the several views, 1 indicates a post which is preferably tubular and is provided throughout its length with a plurality of openings 2 through which are adapted to be inserted the ends of the fence wires 3. The lower end of the post 1 is disposed into a suitable socket 4 which is directed into the ground and is provided at its upper end with a flange or collar 5 which is adapted to rest upon the earth's surface and prevent the socket from entering deeper into the earth.

Disposed around the post 1 and at a point adjacent the upper end thereof is a coupling 6 which is provided upon one side with a hollow stem 7 into which is secured the horizontal portion 8 of a brace arm, said portion 8 being provided at its outer end with an elbow 9 to the opposite end of which is secured the vertical portion 10 of the brace member, said portion 10 extending a distance into the earth and it will be seen that by providing the brace member that the post will be normally held in a vertical position.

In order to reinforce the brace member I dispose through the horizontal portion 8 at a point adjacent its connection with the stem 7, an arm 11, said arm extending a distance at each side of the portion 8 and has secured at opposite ends thereof, rods 12 which are preferably crossed as best shown in Fig. 3 of the drawing and secured at their lower ends to anchors 13.

An additional rod 14 is directed through the elbow 9 and extended toward the post, said rod also being secured to the upper end of an anchor 15 and it will be seen that by providing the upper ends of said rods with nuts 16 that the same may be readily secured in or removed from engagement with the bracing member. The anchors 13 are preferably provided at their lower ends with spiral terminals 17 so that they will have an auger-like action and can be readily directed into the earth and at any desired angle. The upper surface of the coupling 6 is provided with a plurality of notches 18 with which is adapted to engage a latch 19 pivotally mounted upon the post 1, the object of providing said notches and latch being that when the post is rotated to stretch the wires, the latch 19 will successively engage the notches and hold the post in its adjusted position, the post being rotated through the medium of a bar 20 or similar instrument which is disposed through a hollow T-head 21 secured to the upper end of the post.

In operation after the post has been properly secured within the socket 4 and the brace member secured thereto, the loose ends of the fence wires are disposed through the openings 2 and secured therein in any preferred manner after which the post is rotated and the wires drawn taut along the line of fence and in this connection I desire to state that the post and brace herein shown are principally applicable for the corner or end post.

It will now be seen that I have provided a very cheap and economical device for bracing the post and also for stretching the wires and it will be readily understood that should the wires become slack coincident with use the same may be drawn taut by further rotating the post.

What I claim is

1. The combination with a post and a socket therefor; of a brace member comprising a coupling disposed around said post and at a point adjacent its upper end, a horizontal portion secured to said coupling, a vertical portion, an elbow connecting said vertical and horizontal portions, an arm disposed through said horizontal portion, rods having their upper ends secured to said arms, anchors disposed within the ground and secured to the opposite ends of said rods, a similar rod disposed through said elbow and an anchor at the lower end of said rod.

2. A combined brace and stretching device comprising a post, a socket for the lower end of said post, said post having a plurality of openings, a coupling surrounding said post, a plurality of notches at the upper end of said coupling, a latch pivotally secured to said post and adapted to engage said notches, means to rotate said post and a brace member for said post comprising a vertical portion, the lower end of which is embedded within the earth, an elbow at the upper end of said vertical portion, a horizontal portion secured to said elbow and coupling, rods secured to said brace member and means to anchor the lower ends of said rods.

3. A device of the class described comprising a post having a plurality of openings therein, a socket adapted to receive the lower end of said post, a T-head at the upper end of said post, a coupling surrounding said post and having a plurality of notches in its upper end, a latch pivotally secured to said post and adapted to engage said notches and a bracing device interposed between said coupling and the earth whereby said post will be held in a vertical position.

In testimony whereof I have signed my name to this specification in the presence of two subscribing witnesses.

WILLIAM JOHNSON.

Witnesses:
C. B. CARR,
JAMES W. SMITH.